United States Patent
Arbree et al.

(10) Patent No.: US 9,508,114 B2
(45) Date of Patent: Nov. 29, 2016

(54) FILE FORMAT AND SYSTEM FOR DISTRIBUTED SCENE GRAPHS

(71) Applicant: Autodesk, Inc., San Rafael, CA (US)

(72) Inventors: Adam Joseph Arbree, Tiburon, CA (US); Brian Christopher Budge, Tiburon, CA (US)

(73) Assignee: Autodesk, Inc., San Rafael, CA (US)

( * ) Notice: Subject to any disclaimer, the term of this patent is extended or adjusted under 35 U.S.C. 154(b) by 618 days.

(21) Appl. No.: 13/917,343

(22) Filed: Jun. 13, 2013

(65) Prior Publication Data

US 2014/0368522 A1    Dec. 18, 2014

(51) Int. Cl.
*G06T 1/60* (2006.01)

(52) U.S. Cl.
CPC ..................................... *G06T 1/60* (2013.01)

(58) Field of Classification Search
None
See application file for complete search history.

(56) References Cited

U.S. PATENT DOCUMENTS

| | | | |
|---|---|---|---|
| 2004/0100465 A1* | 5/2004 | Stowe | G06T 15/00 345/427 |
| 2007/0294235 A1* | 12/2007 | Millett | G06F 17/30333 |
| 2012/0180122 A1* | 7/2012 | Yan | H04L 29/12028 726/15 |
| 2012/0206653 A1* | 8/2012 | Graves | G11B 27/031 348/571 |
| 2013/0271453 A1* | 10/2013 | Ruotsalainen | G06F 8/38 345/419 |
| 2014/0089273 A1* | 3/2014 | Borshack | G06F 17/30097 707/692 |

* cited by examiner

*Primary Examiner* — Michelle Chin
(74) *Attorney, Agent, or Firm* — Gates & Cooper LLP (57) ABSTRACT

A method, apparatus, system, and computer program product provide the ability to utilize a distributed scene graph. A database of hashes and corresponding location identifiers (for asset locations) is maintained. An export of a scene (including scene assets) is initiated and hash values for the scene assets are computed. If the hash value is not in the database, it is added to the database. If the hash value is in the database, the corresponding location identifier is used to identify the location of the scene asset. The hash value and corresponding location identifier are stored in a scene graph file that is traversed. During the traversal, for each hash value in the scene graph file, the scene asset is retrieved from the location identified in the scene graph file and processed.

20 Claims, 6 Drawing Sheets

FILE FORMAT AND SYSTEM FOR DISTRIBUTED SCENE GRAPHS

BACKGROUND OF THE INVENTION

1. Field of the Invention

The present invention relates generally to cloud computing, and in particular, to a method, apparatus, and article of manufacture for a file format that enables cloud computing with both low data space and low bandwidth consumption.

2. Description of the Related Art

Computing at/in the cloud can be very data intensive. Assets used during computation must be present on the computers where computation is performed. In many cases, these assets are present on a user client machine, and have to be packaged and sent to one or more locations in the cloud. Over time, various problems occur. One problem is that very large amounts of data bandwidth are required to send this data into a permanent storage location in the cloud, and additionally to send that data to the computing machines when it is required for computation. A second problem is the size of data stored on the cloud. Over time, this data may include many duplicates wasting precious space. A third problem is that standard assets uploaded for prior computation cannot be easily "upgraded" when improvements to those standard assets are available. To better understand the problems of the prior art, a description of assets and cloud computing may be useful.

As used herein, an asset refers to an object, shape, image, video clip, media content, audio clip, audio-video clip, etc. Assets are commonly used in a variety of applications including image processing and video editing systems. When editing graphics, etc. a scene graph is commonly utilized. In this regard, a scene graph is typically used for 2D and/or 3D graphics image synthesis (e.g., rendering—either offline high-quality rendering, or fast interactive rendering for real-time scene editing, walkthroughs, animation generation, and games). A scene graph is a general data structure that arranges the logical and often (but not necessarily) spatial representation of a graphical scene. A scene graph is often a collection of nodes in a graph. A node may have many children and also multiple parents, with the effect of a parent applied to all its child nodes. In the context of scene graphs, the graphs may be directed acyclic graphs (DAGs). In a DAG, when a graph edge is followed, the edge only goes one direction, and a traversal can follow any number of edges and never reach the current node again (acyclic).

In a scene graph (also referred to as a process graph/tree), a root node defines a rendering of a particular view of a scene. For a given scene, there may be hundreds of views—which is equivalent to hundreds of root nodes. For example, there may exist a hundred scene graphs of the same box with each scene graph presenting a different view of the box (e.g., different angles or objects [e.g., a ball] inside of the box). Each root node defines everything that would be seen once the scene graph is fully processed.

To process a scene graph (i.e., to render a scene), the graph is traversed (e.g., beginning with the root node and traversing each child node). To improve the rendering time, it may be desirable to perform all or some parts of the rendering using multiple computers/processors available in the cloud (referred to as compute nodes). Thus, with cloud computing, the rendering is not being performed locally where the data originates from. Consequently, the data/assets need to be transmitted/uploaded from the client to the compute node where the rendering is performed. However, the translation and serialization of all assets every time is expensive (both in terms of computation and infrastructure). Further, bandwidth requirements may be prohibitively high for all the data to be transmitted to the cloud. Thus, it is undesirable to rely on data transmitted from a client (e.g., due to limited bandwidth, processing capabilities, infrastructure, etc.).

In addition, because users may re-render data from the cloud, the data may be reused, so it must be stored at the cloud. Storing all of the data in the cloud is expensive (in terms of processing and infrastructure required). Further, over time, some data may be duplicated millions of times in storage. Also, even if stored in the cloud, the data must again be transferred from cloud storage to compute nodes, requiring even more bandwidth. At the renderer, the same data (e.g., texture, mesh, etc.) may be read multiple times, and multiple copies may persist throughout rendering, requiring more memory.

In view of the above, it is desirable to attempt to reduce the amount of data that is stored as well as to reduce the amount of data that needs to be transferred to the compute node.

SUMMARY OF THE INVENTION

Embodiments of the invention overcome the problems of the prior art by utilizing a distributed file format. Assets of a scene are placed into a scene graph file and a de-duplicated (e.g., using a unique hash representation of the asset) to reduce data size. Such assets can be references from any scene graph file defined by other files (in the same format). Further, at scene graph traversal time, assets from multiple files can be utilized to define a scene.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
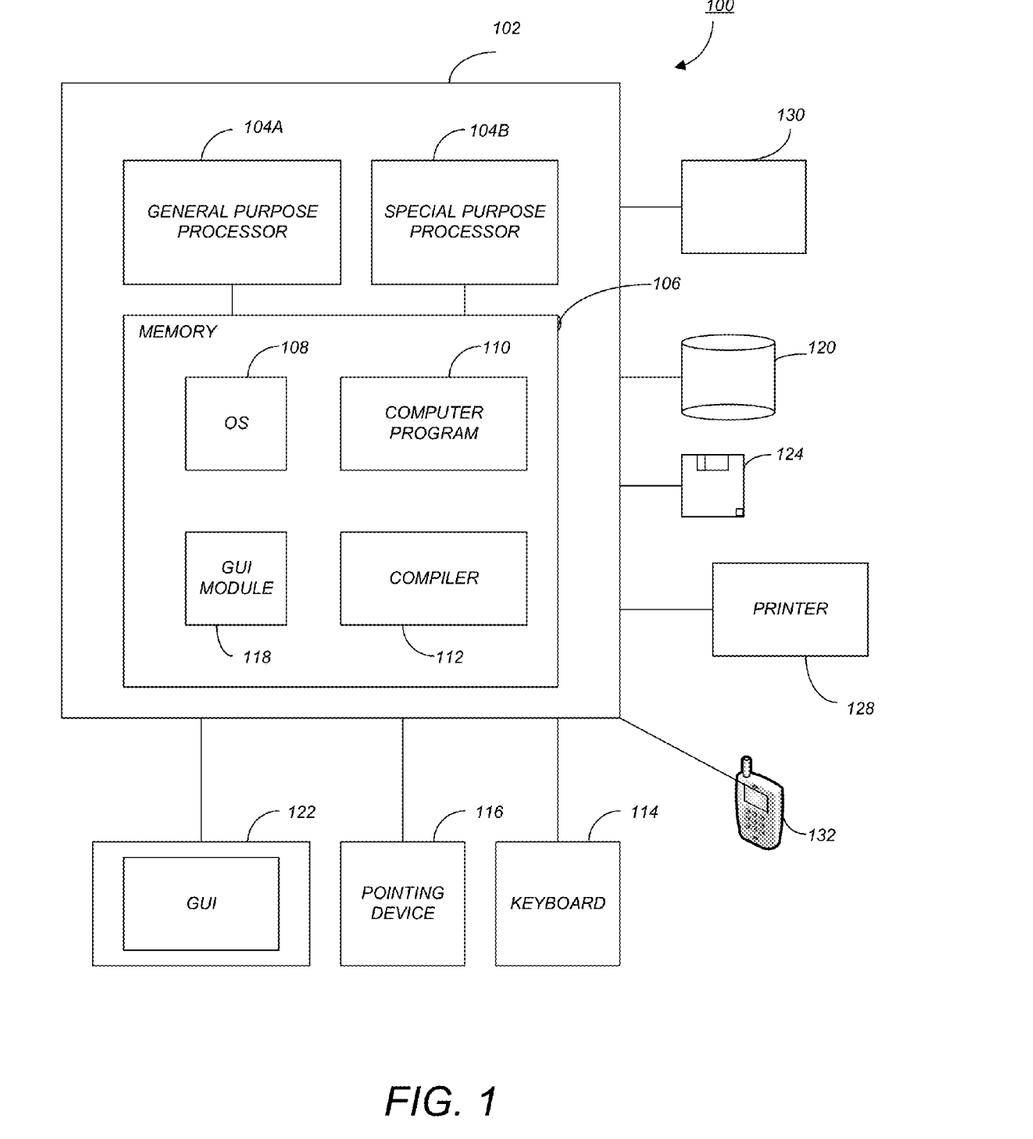
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 that allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, cause the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
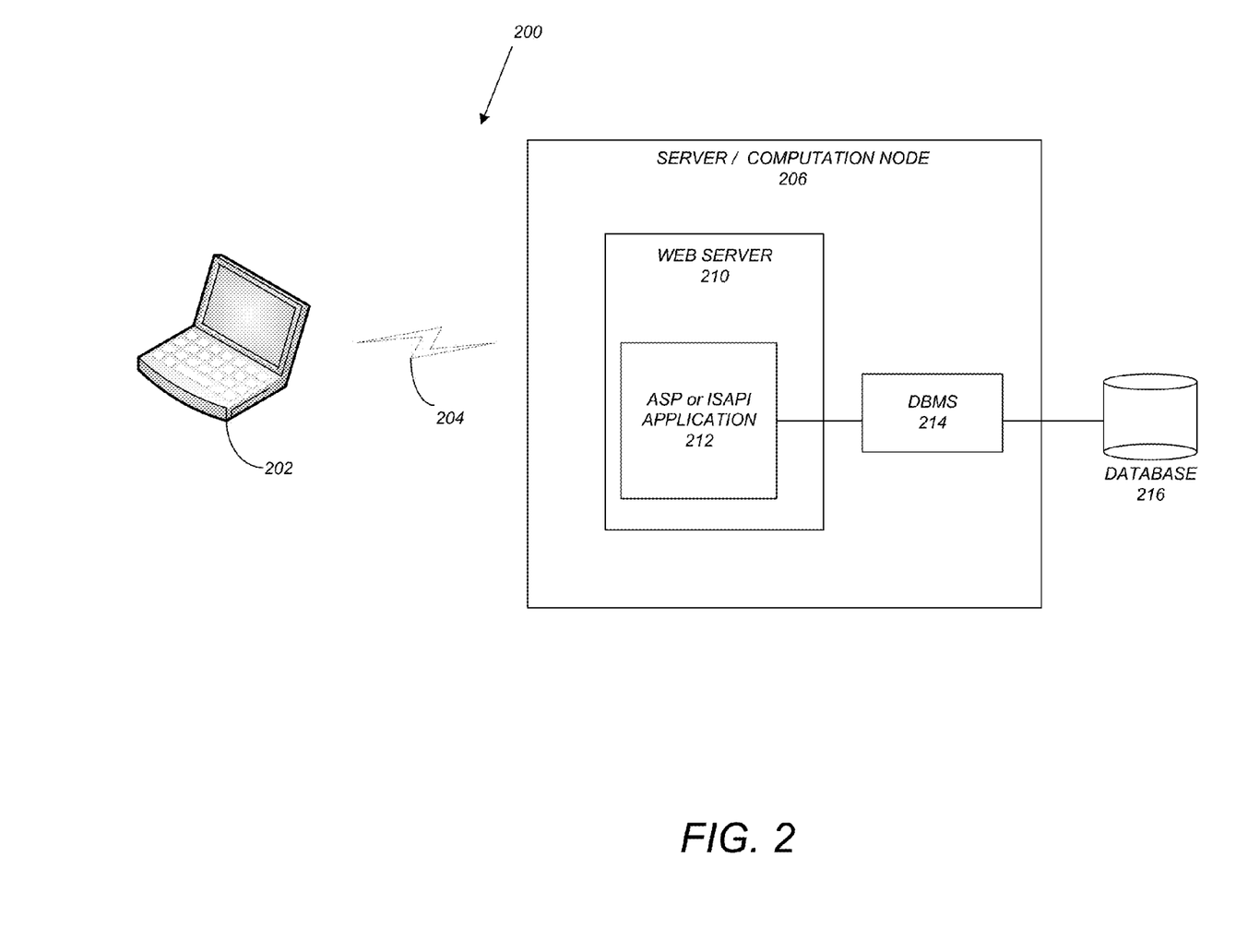
FIG. 2 schematically illustrates a typical distributed computer system using a network to connect client computers to server computers/computation nodes in accordance with one or more embodiments of the invention.

FIG. 2 schematically illustrates a typical distributed computer system 200 using a network 204 to connect client computers 202 to server computers/computation nodes 206

(also referred to as compute nodes). A typical combination of resources may include a network 204 comprising the Internet (e.g., the "cloud"), LANs (local area networks), WANs (wide area networks), SNA (systems network architecture) networks, or the like, clients 202 that are personal computers or workstations (as set forth in FIG. 1), and servers/compute nodes 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers/compute nodes 206 in accordance with embodiments of the invention.

A network 204 such as the Internet connects clients 202 to server computers/compute nodes 206. Network 204 may utilize ethernet, coaxial cable, wireless communications, radio frequency (RF), etc. to connect and provide the communication between clients 202 and servers/compute nodes 206. Clients 202 may execute a client application or web browser and communicate with server computers/compute nodes 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer/compute node 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may be a compute node or other processor configured to performing the operations/processing/rendering required to perform a cloud computing operation. Further, web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server/compute node 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer/compute node" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiment Overview

Embodiments of the invention are implemented as a software application on a client 202 or server computer/compute node 206. Further, as described above, the client 202 or server computer/compute node 206 may comprise a thin client device or a portable device that has a multi-touch-based display.

Software Embodiments

To mitigate the problems of the prior art, scene data/assets may be stored as close to a compute node 206 as possible. In some cases, scene data/assets may be stored on the compute node and in other cases, scene data/assets may be stored on the cloud so that the data/asset does not need to be transmitted/uploaded from the client 202 twice. If stored on the cloud, the data/asset may be stored on a network attached storage (NAS) device, memory, or storage facility(ies) accessible on/from the cloud. In this regard, data may be stored in virtualized pools of storage that may be hosted by third parties (e.g., operating large data centers) and expose the storage as pools that can themselves be used to store files or data objects. Thus, data/assets may span across multiple servers 206 and may be accessible via an application programming interface (API), a cloud storage gateway, or through a web-based user interface. Further, embodiments of the invention may utilize multiple tiers in a cloud while storing the data/asset in the tier closest to a compute node.

To enable the distributed scene graph system, there are two components: (1) the storage/processing of a data/asset; and (2) the traversal of a scene graph containing that references the data/asset. In accordance with embodiments of the invention, once a data/asset has been stored/processed/indexed, a database used during such storing/processing/indexing (in addition to other components) is no longer needed (e.g., during the traversal). To better understand the invention, each of the two components will be described in further detail.

Data/Asset Storage

As described above, scene data/assets may be stored as close to computation nodes as possible (e.g., the scene data/assets may live in cloud storage and may be cached or staged at the compute node). Alternatively, the location where the scene asset is stored may be located closer to a compute node than to a computer where the scene graph file is stored. To minimize the bandwidth, reduce the file size, and to streamline processing, embodiments of the invention may utilize a particular format and system for storing a scene graph.

Figure 3:
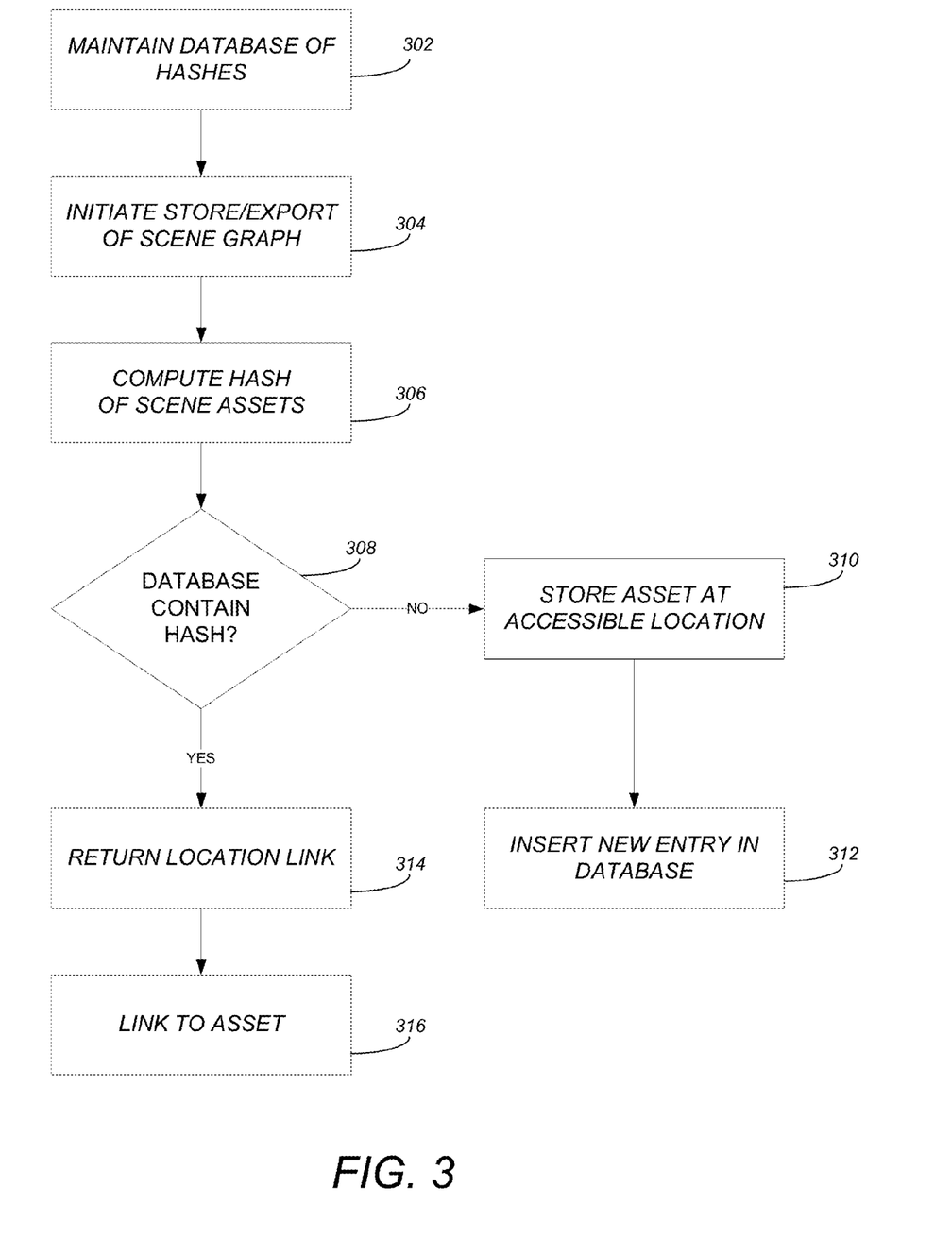
FIG. 3 is a flow chart illustrating the logical flow for storing a scene graph (in the particular format and system) in accordance with one or more embodiments of the invention.

FIG. 3 is a flow chart illustrating the logical flow for storing a scene graph (in the particular format and system) in accordance with one or more embodiments of the invention. At step 302, a database of hashes is maintained. The database of hashes includes a hash identification (ID) corresponding to an asset and a location identifying where the asset is located. Such a location may be a URI/URL (uniform resource identifier/uniform resource location) that identifies the location of the asset. The URI/URL may reference a library of assets (that may reference other externally located data). The database of hashes may be maintained in a library, an SQL database, a relational database, or any type of database. Further, such a database may be maintained on a single server, a group of servers, locally, on the cloud, etc.

At step 304, a user initiates the storage/export of a scene graph. In this regard, when a user opts to store a scene (including the assets/data of a scene), the system may attempt to export the scene graph to create a distributed scene graph.

At step 306, a hash of each asset in the scene graph is computed. Thus, a unique hash ID (e.g., a well distributed large hash such as 256 bit) is assigned to each and every asset. The hash ID may be determined based on one or more hash functions (e.g., MD5) which run over bits of a certain piece of data and compute a hash based thereon. In one or more embodiments, it need not be a cryptographic hash function because malicious activity is not expected.

At step 308, the database of hashes is queried based on the computed hash IDs. The query determines whether the hash exists in the database.

If the database does not contain the hash, the asset is stored at/exported to an accessible location at step 310. Such a location may be on the cloud, local storage, within a local network (such that users on the local network can access the asset), etc. In this regard, the storage location may be required to be at least in the cloud; otherwise future translations that access this asset may not be able to reference it. Although the asset may live in various locations in a cloud hierarchy, there should be one or more definitive locations where the asset lives and where it is accessible to any consumer of the scene graph (e.g., the renderer). At step 312, a new entry is stored in the database. In other words, if the hash was not previously listed in the hash database, an entry is added to the database with the hash ID and a corresponding location where the asset is stored.

If at step 308, it is determined that the database contains the hash ID, a link to the location of the asset is returned at step 314 and the link is used instead of the asset in the stored/exported scene graph.

In view of the above, once the hashes have been computed (i.e., at step 306), instead of placing an asset itself into a scene file, the asset is replaced with a hash and the location of the asset. By utilizing hashes instead of the assets themselves, the scene file size is reduced. Thereafter, at scene compute time (see further description below), the assets may be retrieved based on the hash and URI/URL. However, such assets/data may be located locally or at a location that is close to the compute machine (thereby potentially avoiding limited bandwidth issues). In addition, when storing small files, the duplication of data is reduced (thereby decreasing the amount of storage needed).

As an example, a user/entity may define a library of assets that define different materials (e.g., with various parameters, textures, etc.). A hash database may include hash IDs for all of the materials in the library along with location information to the library that is maintained on a server in the cloud. When a user performs an export of a scene that contains a chair, a hash of the chair is computed at step 306. A remote query of the hash database is conducted at step 308 and returns a link to the exporter at step 314. The exporter then knows to link to that asset based on the location information. If the query fails, a new entry is inserted in the database at step 312 and identifies the asset (via the hash ID) and location of the asset that is currently being exported.

In view of the above, once saved/exported, the scene graph is reduced to a list of hashes and locations identifying where an asset may be retrieved from.

The file format for a scene graph consist of two components: (1) an archive layer; and (2) a metadata and scene graph layer. However, embodiments of the invention are not limited to such a file format.

Archive Layer

Figure 4:
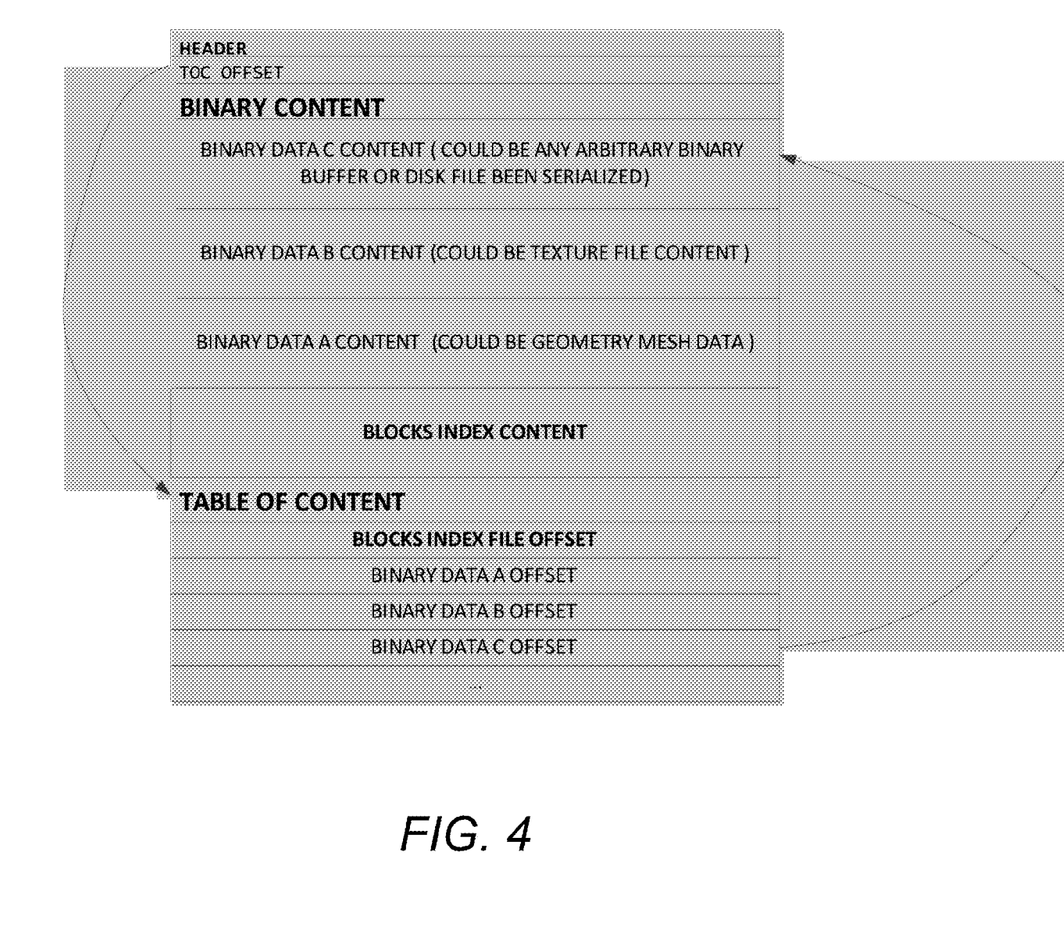
FIG. 4 illustrates a potential format for the archive layer in accordance with one or more embodiments of the invention.

The archive layer is used to store all binary data. FIG. 4 illustrates a potential format for the archive layer in accordance with one or more embodiments of the invention. As illustrated, a header may include a table of contents offset that points to (contains the offset information) for where the table of contents begins in the archive. The table of content includes the offset information (e.g., an offset from the beginning of the file and/or a pointer/link) for where each piece of binary data resides in the archive as well as the offset for the blocks index content. The binary content is stored at the locations identified by the offset (in the table of contents). For example, within the binary content portion of the archive, binary data C content may be an arbitrary binary buffer or disk file that has been serialized, binary data B content may be texture file content, and binary content A may be geometry mesh data.

Accordingly, the table of content identifies the locations of the portion of the scene graph that lives in the current file. The format for the table of content may be XML (extensible markup language) with elements that reference other XML elements in the document (with some references to binary data). Such a format enables the ability for a scene graph to only download the section of the file that contains the relevant asset. For example, if scene graph traversal of Scene A in File A identifies an asset that resides in File B, the entire File B does not need to be downloaded. Instead, using the table of content, the system can identify the location of the particular asset from within File B and retrieve it as necessary.

Thus, the components or the archive layer are the binary assets, scene graph metadata, and the table of contents. The table of contents identifies where all of the information in the archive layer is stored and is loaded first. Each table of content entry may identify the name of the asset, information regarding the compressed size, the uncompressed size, and the byte offset location.

As described above, the archive layer is similar to a ZIP archive and multiple different types of compression may be used (e.g., ZLIB compression). Compression may also be disabled based on the file extension (e.g., by specifying the MIME [multipurpose internet mail extensions] type) (ZLIB compression on a JPEG [joint photographic experts group] file has no real benefit).

In addition, the archive layer that contains the binary data may automatically de-duplicate the data. In this regard, if two meshes are added that are binary identical, the hash computation will be the same and only one of the meshes is stored. Nonetheless, if desired, embodiments of the invention can be configured to create multiple-named references to the same data, or to return a name if the data already exists in the archive. Further, the archive layer may be read via memory mapping of files and it is possible to create a network-based reader for the archive layer so that only needed assets are downloaded (see further details below). Thus, each/binary data has a hash that is unique (with very high probability) allowing for de-duplication and asset aggregation and management.

Metadata and Scene Graph Layer

The metadata/scene graph layer of the file format may consist of a compressed XML (extensible markup language) shallow graph. For example, the XML graph/tree may only be two layers deep where graph node connections form a directed acyclic (or cyclic) graph via named links (that can refer to other nodes or to binary data within the archive). All strings may be de-duplicated and replaced by a base 64 integer to save space. Each file may have a metadata section with a legend describing the string-to-integer mapping. The compressed XML may be stored as a further compressed binary in the archive layer.

In addition to the above, the file/scene graph may be composed/distributed across several files. In such a distributed file, libraries of materials, environments, and other assets may be hosted in the cloud instead of being packed in with the "main" or "root" file. Further, the assets can live on the compute nodes, vastly reducing bandwidth requirements.

The file contents digest is a digest of the contents of the file. The digest contains name/hash mappings and limited metadata about the assets. The digest can be used to determine if a remote file contains any of the assets needed in a scene graph. Thus, the use of a digest may reduce the number of assets written into the main scene file.

In view of the file format described above, it may be noted that it is not necessary to know that the scene graph node data is in XML (or other format) in the file. In this regard, the in-memory representation consist of blocks of names mapped to parameters. Further, binaries may be added directly to the file (e.g., the archive layer of the file) thereby allowing a scene graph to link to it later. Alternatively, whenever a link to a binary is added, the binary may be automatically inserted into the file. Such links may be of the form "location#block_name" where if the location is an empty string, it refers to the current file (i.e., the asset's location is not located remotely). Two blocks of the same name may not be allowed within the same package, but the same block name may exist multiple times in a scene graph in multiple packages. In addition, within a lock it may be allowed to have multiple parameters with the same name.

Reading/Traversing a Scene Graph

Loading a file formatted/stored/exported as described above will result in a scene graph. In addition, before traversal, the scene graph can be updated. For example, it is possible to alias blocks (e.g., a block named Ceramic01 may be aliased to a new block MyMaterial). Further, it is possible to alias entire packages such that if a link is encountered, the correct file identified in the link can be utilized (e.g., if a link "proteinlib#Ceramic01" is encountered, the correct file represented by the location "proteinlib" can be used). In addition, as described above, if the location is null/not specified, a block within the current package/file is utilized by default (e.g., in "location#block_name" if location=" ", the location is assumed to be within the current package/file).

A traverser object/application may be used to facilitate traversal by maintaining state regarding which package the traversal is in at any time. In this regard, the current package may not be the package that the traversal began with (e.g., the location was followed to retrieve a new package/file). The traverse object keeps track of where the processing is during the traversal.

Figure 5:
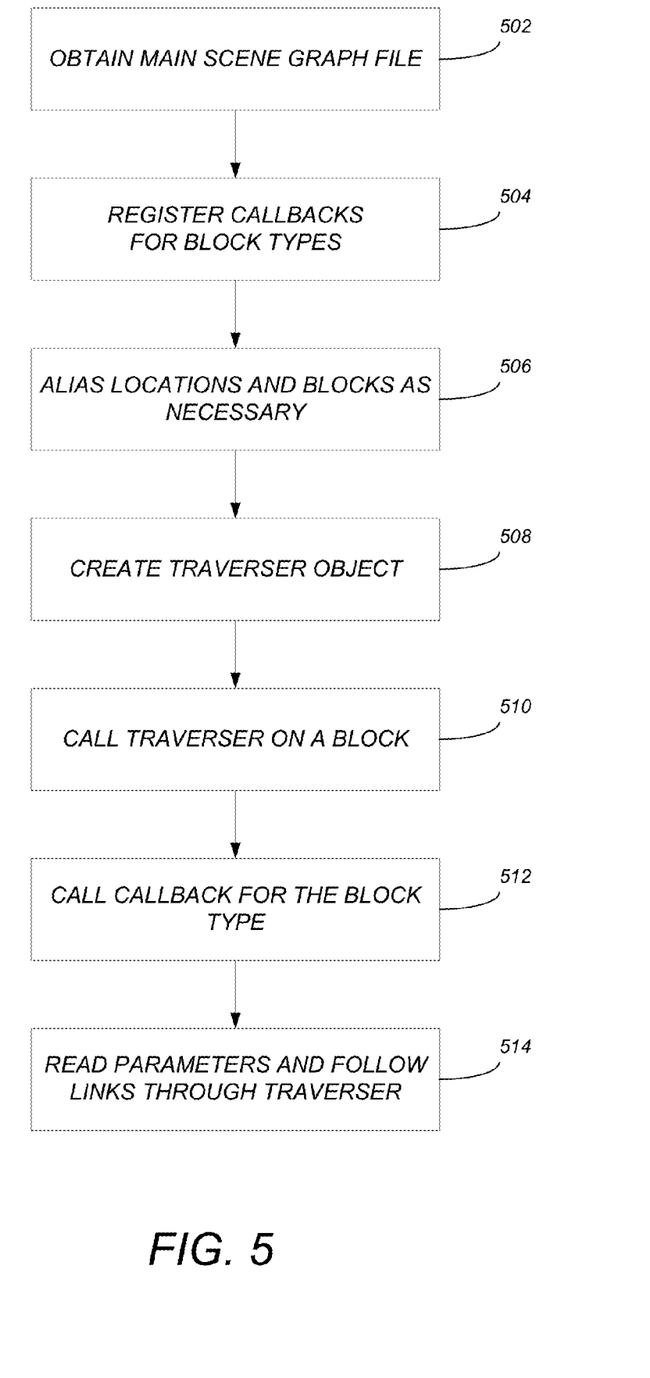
FIG. 5 illustrates the logical flow for traversing a file/loading a scene graph in accordance with one or more embodiments of the invention.

FIG. 5 illustrates the logical flow for traversing a file/loading a scene graph in accordance with one or more embodiments of the invention. In this regard, when a user desires to render a scene (e.g., by hitting a "render" button), the traversal of the scene graph builds up an in-memory version of a scene. The traversal may be carried out locally. Alternatively, the file may be sent to the cloud or a different rendering computer/group of computers for rendering (e.g., a renderer on a different machine or group of machines traverses the file).

At step 502, the main/first/primary scene graph file is obtained. In other words, the scene graph file to be traversed is created/acquired.

At step 504 callbacks for the various block types are registered. In this regard, all blocks are associated with a type (e.g., materials, geometries, meshes, etc.). At step 504, a callback (i.e., an application/function) is registered/associated with all known block types as well as an "unhandled" callback function to handle unknown blocks if encountered during a traversal.

At step 506, any locations and/or blocks may be aliased as needed/necessary. Thus, any locations references in the main scene graph file may be aliased to concrete local files or to files across the network (this may include aliasing locations references in other files visited during a traversal). Any blocks that may need to be replaced may also be aliased (e.g., all instances of a plastic tile material may be replaced with a ceramic tile material [e.g., if now plastic tile material is available]). Step 506 may also include the addition/modification of any blocks in order to change the scene graph.

At step 508, a traverser object is created/obtained.

At step 510, the traverser object is called for the root block in the main scene graph file.

Steps 512 and 514 illustrate what happens during a traversal (e.g., once the traverse has been called on a block). As described above, each block has/is associated with a particular type. At step 512, when a block is visited, the callback function associated with its type is called with the block and the current traverser.

At step 514, the callback function reads any parameters necessary, and follows the links through the traverser object. Thus, in the scene graph, as one object may point to another object, each link is followed and the appropriate callback function is called depending on the block type at each node. As described above, the traverser may carry contextual state that can be passed down through traversal (e.g., a transformation matrix).

Figure 6:
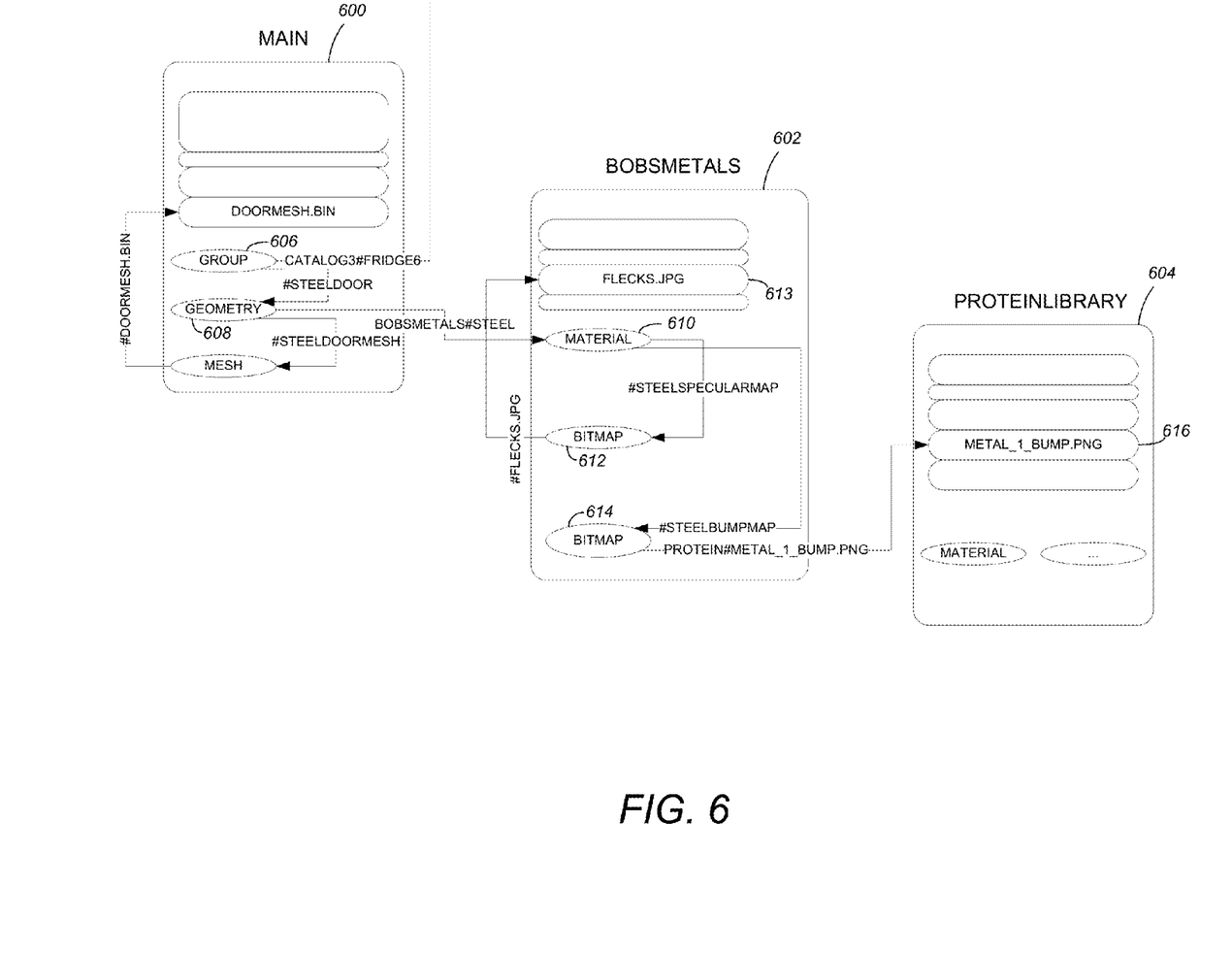
FIG. 6 illustrates an exemplary traversal of a scene graph in accordance with one or more embodiments of the invention.

FIG. 6 illustrates an exemplary traversal of a scene graph in accordance with one or more embodiments of the invention. As illustrated, some person/entity has created a set of specific assets 602 (i.e., BOBSMETALS) that lives on the cloud somewhere. The protein library 604 lives on compute nodes (i.e., on every node that is going to perform a rendering/part of a rendering).

The processing/traversal begins with the main scene graph file 600 at the top group node 606 and follows the appropriate arrows. If one follows the steeldoor identifier, the traversal proceeds to the geometry node 608. A link (i.e., BOBSMETALS#STEEL) is traversed to the location of the material (i.e., the material node 610) (which is in the BOBSMETALS file 602). The material 610 has a few bitmaps 612 and 614 (a specular bitmap 612 and a bump bitmap 614). The specular bitmap links to the JPG file (i.e., FLECKS.JPG 613) that is located within the BOBSMETALS file 602. The bump bitmap 614 links to the PNG file 616 located in the protein library 604. Returning back to the main file 600, the mesh links to a binary set of data (i.e., DOORMESH.BIN) that lives in the same main file 600.

During the scene traversal, the compute/rendering system/node will pull all of the assets needed for rendering. To pull all of the assets, there is no need to use the hash database as the URLs/locations of the files were stored in the appropriate files (e.g., MAIN 600, BOBSMETALS 602, and PROTEIN-LIBRARY 604) when the files were written/exported/saved. In this regard, only during the writing time does the hash database need to be accessed. If desired, for example, if assets might be updated, the hash can be stored in the package (of assets) instead, and the URL can be retrieved from the database/server at traversal time. In this regard, an asset may be referred to by the package either by URL or by hash. If referred to by the URL, no access to the database is required during traversal. However, if referred to by hash, the asset may be modified over time but requires access to a database to determine the location of the asset.

In addition to the above, a rendering of a scene may also trigger the scene to be exported/saved. Accordingly, when a user desires to render a scene (e.g., by selecting a "render" option/button), an additional export of the scene may occur. Some of the scene assets may not be stored in the cloud while other scene assets may merely be references to data already stored in the cloud. When a scene is rendered/export, the file is built and sent off to the cloud for a rendering (e.g., a renderer/rendering farm may be executed on a different machine/group of machines than the machine that is performing the scene graph traversal. The user may be unaware where/which machine is performing the rendering. Instead the user may simply receive an image back. Further, the user likely has no awareness/knowledge that the hashing or a database look-up is being performed.

Illustrative Example

As another example, suppose a user exports/saves "Scene A" that is a park with a chair in it. All assets in the park may live in the cloud. If another scene is rendered that contains the same chair, when the scene is exported, the system checks the database for the location of the chair. Thereafter, during scene graph traversal, the data for the chair is downloaded from cloud storage.

More specifically, when Scene A is exported, a database s consulted about every asset in the scene (ground, chair, etc.). The system determines that the chair is not in the database, and stores Scene A's file at location A in the cloud. The system further informs/stores information in the database indicating that the chair can be found in file A in the cloud.

When Scene B (e.g., that contains an interior that also has the chair) is stored/exported, the hash for the chair is computed and the database is queried to determine the chair location. The query indicates that the chair is in File A in cloud storage. Accordingly, in File B, only a link to the chair is stored (and not the asset itself).

When traversing Scene B, the chair will be downloaded from File A and Location A based on the link/URL stored in File B.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide a scene graph format/system that is fast to write, small, and fast to read. Further, such a system may be intended for write once (or few), and a read many model. The system helps to reduce duplication of data and makes it possible to store frequently used data near a compute node/computer.

More specifically, embodiments of the invention provide a distributed file format that solves problems at several levels. First, assets placed into a file are de-duplicated to reduce data size on a per-package basis (e.g., by utilizing a hash to determine if an asset is a duplication of another asset).

Second, assets in other files in this format can be referenced from any scene graph defined by other files in the same format. Thereafter, at scene graph traversal time, assets from multiple files can be utilized to define the scene. This can save bandwidth in two ways: (a) the format can be designed to seek to and fetch only the portions of files necessary; and (b) commonly used assets can be combined into files that are maintained with better locality to the compute nodes.

Third, assets present in the file format are associated with a unique hash. This allows a larger system to agglomerate commonly used assets into asset libraries, and allows new files of this format to be built with references into theses asset libraries, thereby reducing bandwidth and storage requirements.

Fourth, assets in the scene graph defined in a file of this format are referenced by package name and asset name. Such a package need not be embedded at a physical location, but can be something that is set at a later time. This enables, for example, the replacement of an entire set of standard materials by changing the physical file location for a given package name. Additionally, allowing naming overrides for asset names provides the ability to easily change the scene graph structure.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for utilizing a distributed scene graph comprising:
   maintaining a database, wherein the database comprises one or more asset hashes and corresponding location identifiers identifying where an asset corresponding to each of the one or more asset hashes is located;
   initiating an export of a scene, wherein the scene comprises a scene asset, and wherein the scene comprises a graphical scene;
   computing a hash value for the scene asset;
   determining if the hash value is one of the one or more asset hashes in the database;
   if the hash value is not one of the one or more asset hashes in the database:
      adding the hash value as a new asset hash in the database with a corresponding location identifier identifying where the scene asset is stored;
   if the hash value is one of the one or more asset hashes in the database, utilizing the corresponding location identifier to identify the location of the scene asset;
   storing the hash value and the corresponding location identifier in a scene graph file, wherein the scene graph file comprises a scene graph that is a collection of nodes that arranges a logical and spatial representation of the graphical scene;

initiating a traversal of the scene graph file to render the scene; and during the traversal, for each hash value in the scene graph file, retrieving the scene asset from the location identified in the scene graph file and processing the scene asset, resulting in the rendering of the scene.

2. The computer implemented method of claim 1, wherein the scene asset comprises an object in the scene.

3. The computer implemented method of claim 1, wherein the determining if the hash value is one of the one or more asset hashes comprises querying the database.

4. The computer implemented method of claim 1, wherein:
(a) the scene graph file comprises one or more blocks for each asset;
(b) each of the one or more blocks has a corresponding block type; and
(c) the traversal further comprises:
  (1) registering a callback function for each block type;
  (2) creating a traverser object; and
  (3) calling the traverser object on a first block of the one or more blocks, wherein:
    (i) the traverser object calls the corresponding callback function corresponding to the block type for the first block; and
    (ii) the callback function reads necessary parameters and follows links through the traverser object to retrieve and further process the first block.

5. The computer implemented method of claim 4, wherein the traversal further comprises:
aliasing the location identifiers in the scene graph file to concrete local files;
aliasing one or more of the one or more blocks; and
modifying one or more of the one or more blocks to change the scene graph file.

6. The computer implemented method of claim 1, wherein the database is maintained on a server cloud.

7. The computer implemented method of claim 1, wherein the location where the scene asset is stored is located closer to a compute node than to a computer where the scene graph file is stored.

8. The computer implemented method of claim 1, wherein the location identifier comprises a uniform resource locator (URL).

9. The computer implemented method of claim 1, wherein the traversal of the scene graph file accesses a library of scene assets.

10. The computer implemented method of claim 1, wherein the traversal of the scene graph file does not access the database.

11. A system for utilizing a distributed scene graph, the system comprising:
(a) a computer;
(b) a database, communicatively coupled to the computer, wherein the database comprises one or more asset hashes and corresponding location identifiers identifying where an asset corresponding to each of the one or more asset hashes is located;
(c) a scene storage application executing on the computer, wherein the scene storage application is configured to:
  (1) initiate an export of a scene, wherein the scene comprises a scene asset and wherein the scene comprises a graphical scene;
  (2) compute a hash value for the scene asset;
  (3) determine if the hash value is one of the one or more asset hashes in the database;
  (4) if the hash value is not one of the one or more asset hashes in the database:
    (i) add the hash value as a new asset hash in the database with a corresponding location identifier identifying where the scene asset is stored;
    (ii) if the hash value is one of the one or more asset hashes in the database, utilize the corresponding location identifier to identify the location of the scene asset;
  (5) store the hash value and the corresponding location identifier in a scene graph file, wherein the scene graph file comprises a scene graph that is a collection of nodes that arranges a logical and spatial representation of the graphical scene;
(d) a scene traversal application executing on the computer, wherein the scene traversal application is configured to:
  (1) initiate a traversal of the scene graph file to render the scene; and
  (2) during the traversal, for each hash value in the scene graph file, retrieve the scene asset from the location identified in the scene graph file and process the scene asset, resulting in the rendering of the scene.

12. The system of claim 11, wherein the scene asset comprises an object in the scene.

13. The system of claim 11, wherein the scene storage application determines if the hash value is one of the one or more asset hashes by querying the database.

14. The system of claim 11, wherein:
(a) the scene graph file comprises one or more blocks for each asset;
(b) each of the one or more blocks has a corresponding block type; and
(c) the scene traversal application is further configured to:
  (1) register a callback function for each block type;
  (2) create a traverser object; and
  (3) call the traverser object on a first block of the one or more blocks, wherein:
    (i) the traverser object calls the corresponding callback function corresponding to the block type for the first block; and
    (ii) the callback function reads necessary parameters and follows links through the traverser object to retrieve and further process the first block.

15. The system of claim 14, wherein the scene traversal application is further configured to:
alias the location identifiers in the scene graph file to concrete local files;
alias one or more of the one or more blocks; and
modify one or more of the one or more blocks to change the scene graph file.

16. The system of claim 11, wherein the database is maintained on a server cloud.

17. The system of claim 11, wherein the location where the scene asset is stored is located closer to a compute node than to a computer where the scene graph file is stored.

18. The system of claim 11, wherein the location identifier comprises a uniform resource locator (URL).

19. The system of claim 11, wherein the traversal of the scene graph file accesses a library of scene assets.

20. The system of claim 11, wherein the traversal of the scene graph file does not access the database.

* * * * *